Figure 1:
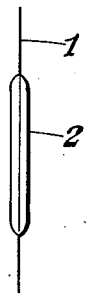

Oct. 31, 1939.   C. BOL ET AL   2,177,685
COMPOSITION OF MATTER
Filed Oct. 2, 1935

INVENTORS
Gottfried B. Jonas
Hendricus J. Lemmens
Cornelis Bol
BY Harry E. Dunham
ATTORNEY Patented Oct. 31, 1939

2,177,685

UNITED STATES PATENT OFFICE 2,177,685

COMPOSITION OF MATTER

Cornelis Bol, Gottfried Bruno Jonas, and Hendricus J. Lemmens, Eindhoven, Netherlands, assignors to General Electric Company, a corporation of New York Application October 2, 1935, Serial No. 43,230
In Germany October 17, 1934

7 Claims. (Cl. 176—50)

The present invention relates to a composition of matter and more particularly the invention relates to a glass composition useful in the manufacture of hermetic, electrically conducting seals for vitreous vessels, such as the sealed containers of gaseous electric discharge devices having current leads of high melting point material, such as tungsten.

We have observed that seals comprising an alkali containing glass fused to the tungsten current leads, such as a sodium-magnesium-borosilicate glass having a coefficient of expansion of between 30 to $50.10^{-7}$, frequently become gas pervious during the manufacture of the seal and of the container of the gaseous electric discharge device. We have discovered that the cause of this difficulty is the formation of alkali-tungstates during the fusing process between the tungsten and the glass. These alkali-tungstate compounds are not stable and decompose at elevated temperatures and the seal becomes gas pervious.

The problem of obtaining an inexpensive, effective seal is particularly acute in the manufacture of quartz containers for gaseous electric discharge devices, such as mercury vapor ultra violet generators. Attempts to solve this problem have been made and various expedients have been used, such as ground joints consisting of a conical glass plug fitted into a conical opening in the container with a thin film of liquid or lacquer interposed between the adjacent surfaces to effect sealing. The effectiveness of this type of seal is poor and the seal is expensive to make. Another seal structure which is more effective but which is also expensive to manufacture consists of a plurality of glass rings fused together to form a body having different coefficients of expansion over its length within the range of the co-efficients of expansion of quartz and tungsten. Attempts have been made to fuse tungsten wires directly to quartz but this is possible only when the tungsten wires are very thin, having a diameter of 10 to 20 microns, for example. The current carrying capacity of such thin wires is so limited, however, that they are useless as current leads for devices having appreciable current loads, such as mercury arc discharge devices.

The object of the present invention is to provide an effective, inexpensive, hermetic, mechanically strong, electrically conducting seal for a gaseous electric discharge device having a container consisting in whole or in part of a material having a low coefficient of expansion. A further object of the invention is to provide a sealing glass which is directly fusible to tungsten to form a fused joint which is gas tight over a wide temperature range. A further object of the invention is to provide a glass which is directly fusible both to tungsten and to quartz to form an hermetic seal. Still further objects of the invention will be apparent from the following detailed description and from the appended claims.

We have discovered that an alumino-borosilicate glass substantially free from alkali and having a coefficient of expansion less than that of tungsten, that is, within the range of 10 to $40.10^{-7}$, is fusible to tungsten which, as is well known, has a coefficient of expansion of 40 to $45.10^{-7}$ and that a seal comprising such glass fused to the tungsten current lead is mechanically strong and is gas tight at temperatures existing thereat during the manufacture of the seal and of the container and during the operation of the gaseous electric discharge device. Preferably the glass has a coefficient of expansion within the range of 10 to $30.10^{-7}$. We have discovered further that when such a glass has a coefficient of expansion of less than $17.10^{-7}$ the glass can be fused directly both to tungsten and to quartz to form an hermetic seal. This is true, likewise, when the glass has a coefficient of expansion less than $15.10^{-7}$ or even $12.10^{-7}$. While the glass is preferably free from alkali or contains but a trace (less than 0.1%) of this material we have demonstrated that good results can be obtained even with a glass containing a small percentage of alkali, i. e., less than 1.5%. By "substantially free from alkali" is meant that the glass contains no alkali or less than 1.5% of this material.

Preferably the softening temperature of the glass is higher than 800° C. so that the seal is hermetic when used in gaseous electric discharge devices the containers of which are at an elevated temperature during the operation of the device, such as high pressure mercury vapor lamps. When desired the alumino-borosilicate glass is not fused directly to the quartz container but is joined thereto by inserting the glass coated conductor into a quartz tube, fusing said tube to the glass coating and then fusing the quartz tube into the quartz container. The fusion of the quartz tube into the quartz container is facilitated in many instances by fusing a quartz ring to the outside of the quartz tube and then fusing the quartz ring into the opening in the quartz container.

The seals of the present invention are of simple structure using a minimum number of intermediate glass bodies between the tungsten conductor and the quartz container and are mechanically strong even at high temperatures since only glasses having high softening temperatures are used.

In the drawing accompanying and forming part of this specification several new seal structures are shown, in which—

Figure 2:
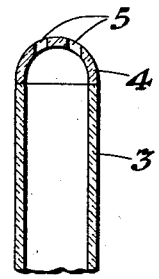
Figure 3:
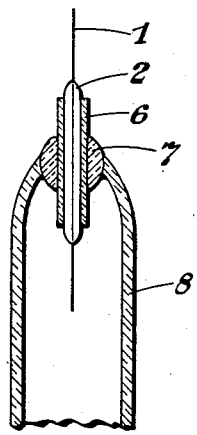
Figure 4:
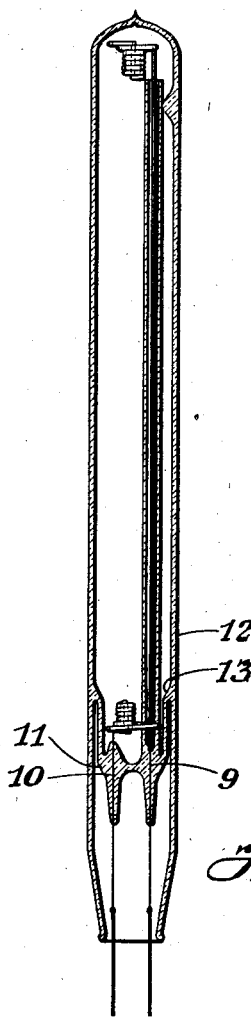

Fig. 1 is an elevational view of a glass coated current lead,

Fig. 2 is a sectional view of one end of a small tubular vessel into which the element shown in Fig. 1 is to be fused to form a seal, Fig. 3 is similar to Fig. 2 and illustrates the element of Fig. 1 fused into another type of seal for a vessel, and Fig. 4 is a front elevational, partly sectional view of a gaseous electric discharge device having a seal made in accordance with the present invention.

Like numbers denote like parts in all the figures.

Referring to Fig. 1 of the drawing the seal element illustrated therein consists of a tungsten wire 1 having a diameter of approximately 0.5 mm. and a coating 2 of glass fused to said wire 1. The glass of coating 2 has the following composition:

| | Per cent |
|---|---|
| Silica ($SiO_2$) | 88.3 |
| Boric oxide ($B_2O_3$) | 8.4 |
| Aluminium oxide ($Al_2O_3$) | 2.9 |
| Calcium oxide (CaO) | 0.4 |

A glass of this composition has a coefficient of expansion of between 10 and $15.10^{-7}$ and a softening temperature of approximately 1000° C. This glass adheres strongly to tungsten, is mechanically strong and is not injured by the strains incidental to the fusion of this element into a vessel, such as a quartz container for a gaseous electric discharge device.

When desired, the diameter of the tungsten wire 1 can be increased to approximately 1 mm. provided a single crystal tungsten wire is used. Pure tungsten wires of approximately 0.5 mm. are successfully used in the seal. In certain instances thoriated tungsten wires are used to advantage.

A method of fusing the wire 1 into a quartz tube 3 of small diameter is illustrated in Fig. 2 of the drawing wherein a perforated cap 4 of glass having the above composition is first fused to the end of said tube 3. A seal element 1, 2 is then inserted into each one of the openings 5 in the cap 4 and said cap 4 and each of the glass layers 2 are heated to the fusion temperature thereof to form a fused, gas tight joint between the tungsten leads 1 and the quartz tube 3.

Fig. 3 illustrates a different type of seal structure than that shown in Fig. 2. In this seal the element 1, 2 is first inserted into and fused to a quartz tube 6. A quartz ring 7 is then fused to the quartz tube and the ring 7 is then fused into the quartz container 8 to form an hermetic seal. When desired, the quartz ring 7 is omitted and the quartz tube 6 is fused directly to the container 8.

A complete gaseous electric discharge lamp device having a seal made in accordance with the present invention is illustrated in Fig. 4 of the drawing. The lamp comprises an elongated tubular container 12 having electrodes mounted at the ends thereof and having the current leads 9 and 10 for the electrodes sealed into one end thereof. Each of the electrodes comprises a material having high electron emissivity, such as an alkaline earth oxide, are electron emitting when at an elevated temperature and are heated to such temperature by the discharge current. The container 12 has a starting gas therein, such as argon, or neon or a mixture of such gases, and a quantity of mercury therein. The current leads 9 and 10 are of tungsten and are fused into a cylindrical cap 11 in the manner described in connection with Figs. 1 and 2 of the drawing. The outside diameter of the cap 13 is somewhat smaller than the inside diameter of the container 12 and the rim of the open end of said cap 13 is fused to the container 12. The lamp is operated at a current such that the container 12 is at an elevated temperature and the mercury vapor is at correspondingly high vapor pressure. Such a lamp is an efficient source of high intensity light.

Tungsten current leads of approximately 2 mm. in diameter can be fused into a quartz vessel, when desired. In this case one or more glass bodies having coefficients of expansion intermediate that of the glass fused to the tungsten leads and that of the quartz are used. For example, a layer of glass having the following composition is fused to a tungsten wire of approximately 2 mm. in diameter:

| | Per cent |
|---|---|
| Silica ($SiO_2$) | 83.1 |
| Boric oxide ($B_2O_3$) | 6.1 |
| Aluminium oxide ($Al_2O_3$) | 7.1 |
| Calcium oxide (CaO) | 3.7 |

This glass has a coefficient of expansion of approximately $25.10^{-7}$ and adheres strongly to tungsten. In between this glass layer and the quartz vessel a glass having the following composition is used:

| | Per cent |
|---|---|
| Silica ($SiO_2$) | 85.8 |
| Boric oxide ($B_2O_3$) | 6.6 |
| Aluminium oxide ($Al_2O_3$) | 6.6 |
| Calcium oxide (CaO) | 1.0 |

The coefficient of expansion of this glass is approximately $15.10^{-7}$ and the glass is fusible directly to quartz. All the elements of the seal are fused together to make an hermetic seal for quartz vessels.

While we have shown and described and have pointed out in the annexed claims certain novel features of the invention, it will be understood that various omissions, substitutions and changes in the forms and details of the device illustrated and in its use and operation may be made by those skilled in the art without departing from the broad spirit and scope of the invention.

What we claim as new and desire to secure by Letters Patent of the United States, is:

1. An hermetic, electrically conducting seal comprising a tungsten conductor, and a glass coating fused to said conductor, said glass being substantially free from alkali and having a coefficient of expansion less than that of tungsten.

2. An hermetic, electrically conducting seal comprising a tungsten conductor, and a glass coating fused to said conductor, said glass being substantially free from alkali and having a coefficient of expansion less than $40.10^{-7}$ and greater than $10.10^{-7}$.

3. An hermetic, electrically conducting seal for a quartz vessel, said seal comprising a tungsten conductor and a glass coating fused to said conductor, said glass being substantially free from alkali, having a softening temperature higher than 800° C., having a coefficient of expansion of less than $17.10^{-7}$ and being directly fusible to quartz.

4. An hermetic, electrically conducting seal for a tubular quartz vessel, said seal comprising a tungsten conductor, a perforated glass cap fused to the end of said vessel, and a glass coating fused to said conductor, said glass cap and said glass coating being of a glass substantially free from alkali, having a softening temperature greater than 800° C. and having a coefficient of expansion of less than $17.10^{-7}$, said glass coating being fused into the opening in said cap to hermetically close the end of said quartz tube.

5. An hermetic, electrically conducting seal for a quartz vessel, said seal comprising a tungsten conductor, a glass coating fused to said conductor, and a quartz tube fused to said coating, said glass being substantially free from alkali, having a softening temperature higher than 800° C. and having a coefficient of expansion of less than $17.10^{-7}$, said quartz tube being fused into said quartz vessel to form an hermetic joint between said vessel and said conductor.

6. An hermetic, electrically conducting seal for a quartz vessel, said seal comprising a tungsten conductor, a glass coating fused to said conductor, a quartz tube fused to said coating and a quartz ring fused to said tube, said glass being substantially free from alkali, having a softening temperature higher than 800° C. and having a coefficient of expansion of less than $17.10^{-7}$, said quartz ring being fused into said quartz vessel to form an hermetic joint between said vessel and said conductor.

7. An hermetic, electrically conducting seal for a quartz vessel, said seal comprising a tungsten conductor, a glass coating fused to said conductor, and an intermediate glass fused to said coating and to said quartz vessel, each of said glass bodies being free from alkali, the coating glass having a coefficient of expansion of approximately $25.10^{-7}$ and the intermediate glass having a coefficient of expansion of approximately $15.10^{-7}$.

CORNELIS BOL.
GOTTFRIED BRUNO JONAS.
HENDRICUS J. LEMMENS.